United States Patent [19]

Zardi et al.

[11] 4,405,562

[45] Sep. 20, 1983

[54] AXIAL-RADIAL REACTOR FOR HETEROGENEOUS SYNTHESIS

[75] Inventors: Umberto Zardi, Lugano, Switzerland; Ettore Comandini, Rome, Italy

[73] Assignee: Ammonia Casale S.A., Lugano, Switzerland

[21] Appl. No.: 318,568

[22] Filed: Nov. 5, 1981

[51] Int. Cl.$^3$ .................. B01J 8/04; C01C 1/04
[52] U.S. Cl. .................. 422/148; 422/191; 422/192; 422/194; 422/195; 422/218; 422/207
[58] Field of Search .............. 422/148, 192, 191, 198, 422/181, 218, 207, 194, 195

[56] References Cited

U.S. PATENT DOCUMENTS

| | | | |
|---|---|---|---|
| 3,663,179 | 5/1972 | Mehta et al. | 422/148 |
| 3,694,169 | 9/1972 | Fawcett et al. | 422/148 |
| 3,932,139 | 1/1976 | Vilceanu et al. | 422/148 |
| 4,277,444 | 7/1981 | Landeghem | 422/192 |

Primary Examiner—Michael S. Marcus
Attorney, Agent, or Firm—Holman & Stern

[57] ABSTRACT

In a reactor comprising an outer shell and an internal cartridge preferably obtained by assembling a number of stackable modular cartridges, each comprising from the outside to the inside at least one solid wall forming an air space with the shell inside wall, a continuous bottom to the solid wall, a first wall perforated for the whole of its length, a second internal wall only partially perforated, and a catalytic bed inserted between the said bottom and said walls totally respectively partially perforated, at least one heat exchanger is arranged centrally and axially in a catalytic bed; the feed gas which has cooled the external wall of the shell collects in a duct in the middle of the exchanger along which it runs in one way (for example, from top to bottom) running successively along the exchanger in the other way inside the exchanger tubes emerging preheated in the free zone over the top layer of the catalytic bed where it is mixed with fresh gas fed directly from the outside of said zone. This mixture of preheated gas and fresh gas passes through the catalytic bed first axially and then radially, collects in the centre, touches the outside of the heat exchanger tubes and from the bottom of the exchanger is sent directly to the next catalytic bed.

5 Claims, 1 Drawing Figure

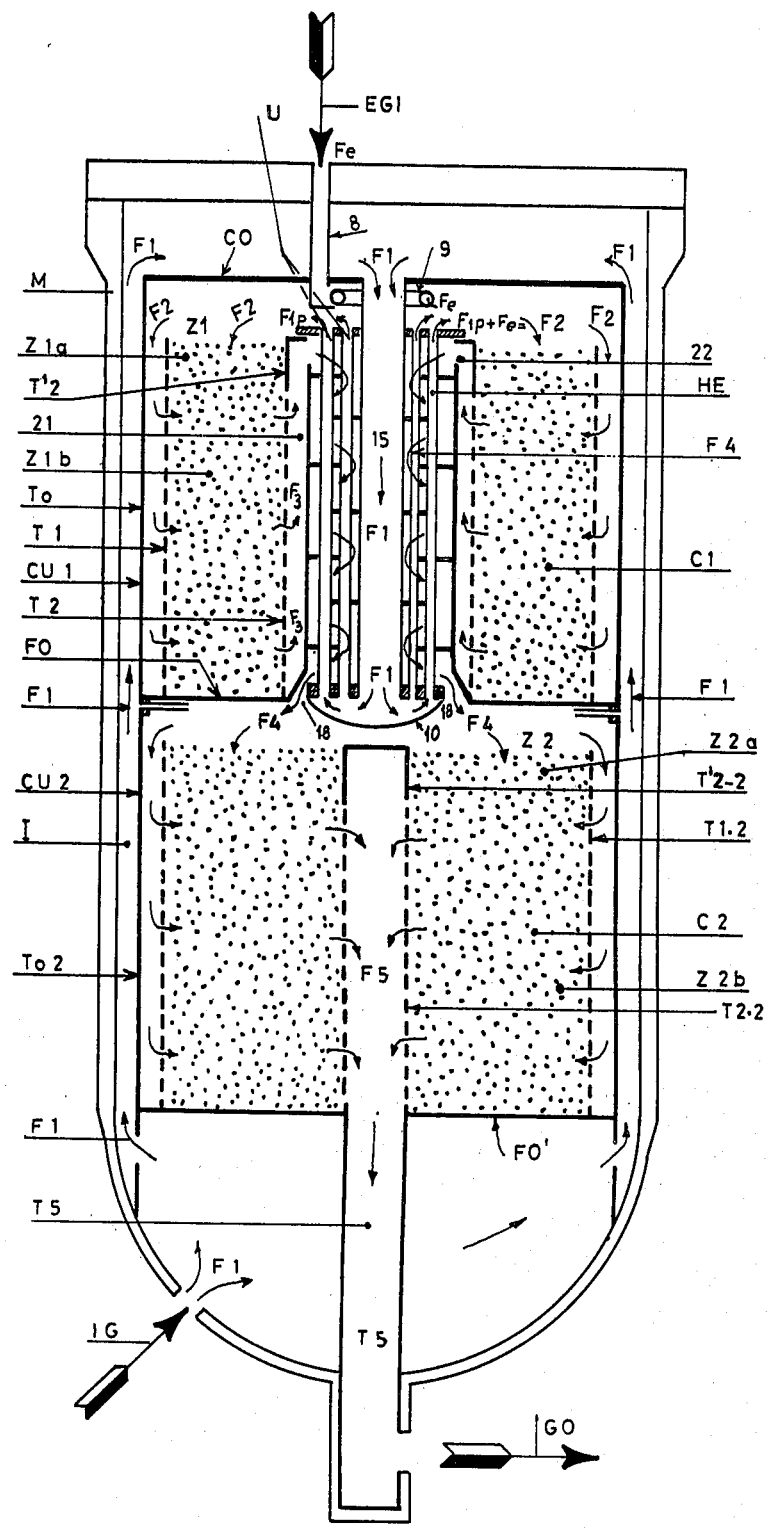

AXIAL-RADIAL REACTOR FOR HETEROGENEOUS SYNTHESIS

BACKGROUND OF THE INVENTION

1. Field of the Invention

This invention concerns reactors for heterogeneous synthesis, and moe particularly for the catalytic synthesis of ammonia, methanol, fuel and higher alcohols, monomers and similar substances, consisting of an outer shell, an internal cartridge comprising a solid wall forming an air space with the inside wall of the shell, at least one catalytic bed containing granular catalyst arranged between a bottom and two concentric cylindrical walls of which the outer wall is perforated for the whole of its axial length and the inner wall is unperforated along a small part; of means for feeding the reaction gas, of means to extract reacted gas, of at least one heat exchanger, and of the means to feed to the latter fresh exchange gas.

2. Description of the Prior Art

Reactors of this type are described in the Applicant's U.S. patent application Ser. No. 162,436 now U.S. Pat. No. 4,372,920; they are characterised by the fact that each layer or catalyst bed is run through by reaction gas in one zone with prevalently axial flow, and in another zone with prevalently radial flow, the prevalently axial flow zone acting also as sealing pad between catalyst layers. Preferably the cartridge is advantageously obtained by simply assembling the cartridge modules, each formed (going from the outside towards the inside) by a cylindrical solid side wall, by a solid bottom which may be the continuation of the external solid wall, by a first cylindrical wall perforated for the whole of its axial length and by a cylindrical internal wall perforated only in part, namely having at least a small axial length unperforated: the catalyst bed is arranged on said bottom and said delimited by the said lateral walls fully respectively partially perforated. Each layer or catalyst bed is open at the top where the prevalently axial flow zone acts as sealing pad. Moreover, there is always a separation zone between catalytic beds to which is sent the cold gas to be used for exchanging heat (directly or indirectly) with the preheated and/or already partly reacted gas.

In the case of indirect heat exchange, the heat exchanger between cold synthesis gas and partly reacted hot synthesis gas is arranged axially to the reactor in the central part of the catalytic layers: the tubes of these single exchangers are run through internally by the cold feed gas and are lapped externally by the hot gas which has flowed (axially and radially) through the catalytic bed wrapping the exchanger in question, as well as the catalytic layer or layers preceding it. It may be also anticipated that U.S. Pat. No. 4,181,701 describes a reactor with exclusively radial flow and centrally arranged heat exchanger.

SUMMARY OF THE INVENTION

Continuing its research, studies and experiments in such a vital and important field as that of axial-radial reactors (today even more vital because of the substantial energy savings which can be effected), the Applicant has succeeded in providing an axial-radial flow reactor with indirect heat exchange that is both very efficient and extremely simple in construction.

The reactor according to the invention has the following features: a heat exchanger arranged axially and centrally to a catalytic bed; a fresh process gas which has cooled the shell internal wall collects in a tube in the centre of the exchanger flowing along it one way (for example from top to bottom) to flow then along the same way in the other direction inside the tubes of said exchanger, emerging preheated in the free zone above the top surface of the catalytic bed, where it is mixed with the fresh exchange gas fed directly from the outside into zone; that the mixture of preheated process gas and fresh exchange gas so obtained flows first axially and then radially through the whole catalyst bed, collects in a central air space, and is sent to lap the outside of the tubes of the exchanger, from the bottom of which the mixture is sent directly to the next catalytic bed through which it will flow first axially and then radially to collect in the centre, eventually to pass from the reactor. One of the advantages of the invention is that the whole reactor can be constructed simply and efficiently without any loss of volume due to the system regulating the process temperature.

In particular, the inner cartridge can now be constructed with several stackable modular cartridge, light (only one wall is solid) and possible to assemble in situ, and with open-top catalytic beds. It should be emphasized that reactors with the heat exchanger arranged centrally and axially to a catalytic bed are alreay known; in particular, U.S. Pat. No. 4,181,701 describes a reactor with exclusively radial flow in which a heat exchanger is arranged in the central area of a catalyst bed and is fed with fresh exchange gas. However, not only is the type of reactor (exclusively radial) different and complex (when compared to the invention) but also the structure and behavior of the exchanger in the economy of the whole system controlling process conditions are also different; even the loss of volume, in the said U.S. Pat. No. 4,181,701, is not indifferent.

DETAILED DESCRIPTION OF THE INVENTION

The various aspects and advantages of the invention will become more apparent from the following description of the preferred embodiment shown as an illustration (but not as a limitation) in the attached drawing, which is a partial schematic longitudinal section of a reactor according to the invention.

As described in the Applicant's previous patent application Ser. No. 162,436, whose description must be considered as an integral part of this text, the reactor consists of a pressure shell or outer cover M and of an internal cartridge which in the attached drawing is advantageously represented in the form obtained by assembling "in situ" several modular cartridges $CU_1$, $CU_2 \ldots CU_i \ldots CU_{n-1}$, $CU_n$. To simplify both illustration and representation, only two cartridges $CU_1$ and $CU_2$ have been shown, each consisting of external wall $T_0$ which preferably forms a single piece with bottom FO and with a lid CO. Inside $T_0$ are found a first cylindrical wall $T_1$ perforated along all its axial length, and a second cylindrical wall $T_2$ which is also perforated but also has an unperforated extension $T'_2$. In other words, internal wall $T_2$ is perforated on a length which corresponds to the difference between axial extensions $T_1$ and $T'_2$, i.e. to $T_1 - T'_2$. Lateral walls $T_1$ and $T_2 + T'_2$ define with bottom FO the layer or catalytic bed $C_1$ formed by granular catalyst. The same modular cartridge structure (i.e. assembled simply by stacking) is found in $CU_2$ whose catalyst basket $C_2$ is enclosed by bottom FO', internal fully perforated wall $T_{1.2}$, the inner wall perforated along $T_{2.2}$ and unperforated along $T'_{2.2}$. Said basket is free at the top, i.e. between bottom FO of upper basket $C_1$ and the free surface at the top of basket $C_2$ there is a free zone $Z_2$ substantially similar to free zone $Z_1$ between the internal wall of lid CO and the free upper surface of catalyst layer $C_1$. By virtue of unperforated wall $T'_2$ (resp. $T'_{2.2}$) on each basket the catalyst zone $Z_{1a}$ with axial extension $T'_2$ will be run through by a prevalently axial gas flow while zone $Z_{1b}$ with extension $T_2$ of perforated wall will be run through by a prevalently radial flow.

According to the most important aspect of the invention, a catalyst basket and in particular the basket nearest to one end of the reactor preferably at the opposite end to process gas inlet IG, has an annular central zone occupied by indirect heat exchanger HE which with its central tube 15 to collect process gas, with its lower closing cover 10 and with its series of heat exchanging tubes U forms a critical and advantageous arrangement and combination with a short run of fresh exchange gas EGI flowing directly into free zone $Z_1$ of catalyst bed $C_1$.

It will be seen in effect that by a fortunate combination of process gas runs in the exchanger and exchange gas in the open-top zone of the catalytic bed an efficient system is created to regulate process conditions with a simply and efficiently constructed reactor. As the drawing shows, the cold inlet gas enters in IG and flows from bottom to top along the run indicated by arrows $F_1$ running along air space I between outer walls $T_0$ and $T_{0.2}$ of cartridges $CU_1$, $CU_2$ and the internal wall of shell M which is therefore so cooled. At the top of the reactor this main flow $F_1$ is sent to the centre of duct 15 in the centre of heat exchanger HE which is thus run through by $F_1$ in one direction, for example, from top to bottom. Exchanger HE (arranged centrally and axially to catalyst bed $C_1$) is closed at the bottom by lid 10 so that gas $F_1$ is forced by 10 to flow the other way, for example upwards flowing inside tubes U of the exchanger which it leaves in free zone $Z_1$ as preheated gas $F_{1p}$. In the same zone $Z_1$, i.e. inside lid CO, also arrives duct 8 fed by a flow of fresh exchange gas EGI (exchanger by-pass inlet): duct 8 ends with toroidal outlet 9 and spreads throughout $Z_1$ fresh gas $F_e$ (exchange gas) which mixes with main gas flow $F_{1p}$ (leaving from the top of heat exchanger HE) so that in $Z_1$ is found gas mixture $F_2=F_{1p}+F_e$ part of which will flow through zone $Z_{1a}$ of $C_1$ axially and the remaining part through zone $Z_{1b}$ of the basket with a prevalently radial flow, collecting inside air space 21 beyond perforated wall $T_2$. The gas flow $F_3$ (which started as the mixed gas flow $F_2=F_{1p}+F_e$ which has partly flown axially through zone $Z_{1a}$ and partly radially towards the inside of zone $Z_{1b}$ of catalyst bed $C_1$ is therefore partly reacted and thus hot) by collecting in 22 must go through exchanger HE, i.e. it must lap externally tubes U of HE; this run of gas $F_3$ outside tubes U is indicated by semicircular arrows $F_4$. This gas indicated by $F_4$ transfers heat to main gas flow $F'_1$ (which is $F_1$ after it has run from top to bottom along central tube 15 of HE) which because of closing by means of lid 10 flows upwards of the exchanger inside tubes U which it leaves at the top as preheated flow $F_{1p}$ to mix with secondary exchange flow $F_e$ in free zone $Z_1$.

As can be clearly seen from the drawing, gas flow $F_4$ (which is the partly reacted flow on bed $C_1$ inside which, i.e. in 21, it had collected as flow $F_3$) leaves from lower annular outlets 18 of exchanger HE and flows onto the second catalyst bed $C_2$ running through its first part (that which has an extension equal to the height of unperforated wall $T'_{2.2}$) with prevalently axial flow, and through the second part (that with the extension of perforated wall $T_{2.2}$) with a prevalently radial flow; the radial flow is centripetal as in zone $Z_{1b}$ of the first basket $C_1$, so that all the gas which has flown also through the second catalyst basket collects as flow $F_5$ and leaves through tube $T_5$ from gas outlet GO. The system to control gas temperature inside the reactor, according to the invention, has proved extremely efficient, flexible and reliable. It suffices, in effect, to control the flow of exchange gas $EGI=F_e$ according to $F_1$ and its condition after preheating ($F_{1p}$) to be able to establish optimal process conditions.

The reactor in which these optimal process conditions can be achieved is simply constructed and efficient; in fact, there is no loss of actual volume (as in the known art), the cartridge may be put together with stackable modules which do not need any fixing, they are light because they have only one solid wall, and are erected in situ; there are no tubes for exchange gas (EGI) flowing through the reactor; each catalyst basket remains open at the top so that dividing walls between baskets are not necessary; even the topmost part of the catalyst (which in the known art is not exploited) is used (axially).

It is obvious that the invention, even if the description for the sake of clearer understanding refers to the simplest form of embodiment shown in the drawing, is not at all limited to this, but can be used with a reactor with any number of catalyst baskets and with any type of cartridge. So that if there are more than two baskets, only one exchanger can be used according to the invention, or at least one more can be inserted in the basket next to the second basket.

Even if the cartridge is preferably formed by several stackable cartridges, the invention applies just as efficiently to a single-piece cartridge. Equally, exchanger HE can be replaced by a different exchanger with the same characteristics of behaviour.

We claim:

1. In a vertical apparatus for heterogenous exothermic catalytic reactions of gases under pressure comprising: a container having an inlet for introduction of gaseous reactants and an outlet for the efflux of products of the reactions; a cartridge having a lid and a cylindrically shaped wall mounted within the container and communicating with the inlet and the outlet; at least two stationary-bed catalyst-containing baskets supported within the cartridge, each of said baskets having an imperforate bottom section, a cylindrical perforated outer wall, a cylindrical lower-perforated concentric inner wall and an annular opening defined by said perforated outer and inner walls in the upper end of each stationary-bed catalyst-containing basket; wherein the opening formed in a plane approximately perpendicular to the longitudinal axis of the perforated outer and inner walls, the bottom section, and the perforated inner and outer walls, cooperates with the cylindrically shaped cartridge wall to form a partially restrictive axial flow means; whereby a portion of the gaseous reactants enters or departs and passes through the annular opening in each of the stationary-bed catalyst-containing baskets substantially in the axial direction and the remainder of the gaseous reactants enters and passes through the cylindrical outer perforated wall of each of the catalyst-containing baskets substantially in a radial direction;

the improvement wherein a heat exchanger is positioned within an annular central zone defined by the perforated inner wall of at least the uppermost of said baskets; said heat exchanger comprising a central tube whose upper end is adapted to receive cold process gas which has been introduced at the lower end of said container and which has first passed upward between the container and the cartridge and whose lower end opens to a baffle adapted to direct the process gas exiting said central tube upward through a plurality of heat exchanging tubes parallel to said central tube and mounted between said central tube and said perforated inner wall; the heated gas exiting from the top of said heat exchanging tubes then being directed radially outward to the top of said uppermost catalyst basket through a free zone defined by said cartridge lid, so that pre-heated gas leaving the heat exchanger tubes is directed through the catalyst bed of the uppermost basket and when exiting through the perforated inner wall after being heated by the catalysis the hot gas flows around the heat exchanger tubes giving up heat to the cold gas passing upward through said heat exchanger tubes, before passing to the next lower basket;

and the further improvement wherein means for introducing quenching gas into said free zone are provided.

2. The improvement of claim 1 wherein said quenching gas introducing means is a duct flowing from a quenching gas source directly into said free zone so that said quenching gas is mixed with said pre-heated gas in said free zone and the mixed gases are directed through the catalyst-bed of the uppermost basket.

3. The improvement of claim 2 wherein said duct ends in a coaxial toroidal outlet so that the gases are more readily mixed.

4. The improvement of claim 1 wherein said apparatus contains only two stationary-bed catalyst-containing baskets and said heat exchanger is positioned only in the uppermost of said baskets.

5. The improvement of claim 1 wherein said apparatus contains more than two stationary-bed catalyst-containing baskets and said heat exchanger is positioned only in the uppermost of said baskets.

* * * * *